(12) United States Patent
Knappe

(10) Patent No.: US 10,520,789 B2
(45) Date of Patent: Dec. 31, 2019

(54) MODULAR ULTRAVIOLET PULSED LASER-SOURCE

(71) Applicant: Coherent Kaiserslautern GmbH, Kaiserslautern (DE)

(72) Inventor: Ralf Knappe, Trippstadt (DE)

(73) Assignee: COHERENT KAISERSLAUTERN GMBH, Kaiserslautern (DE)

( * ) Notice: Subject to any disclaimer, the term of this patent is extended or adjusted under 35 U.S.C. 154(b) by 106 days.

(21) Appl. No.: 15/664,176

(22) Filed: Jul. 31, 2017

(65) Prior Publication Data
US 2018/0059508 A1 Mar. 1, 2018

Related U.S. Application Data

(60) Provisional application No. 62/379,639, filed on Aug. 25, 2016.

(51) Int. Cl.
| | |
|---|---|
| *G02B 26/08* | (2006.01) |
| *G02F 1/35* | (2006.01) |
| *G02B 13/00* | (2006.01) |
| *G02B 26/10* | (2006.01) |
| *G02F 1/355* | (2006.01) |
| *H01S 3/00* | (2006.01) |

(52) U.S. Cl.
CPC ....... *G02F 1/3501* (2013.01); *G02B 13/0005* (2013.01); *G02B 26/105* (2013.01); *G02F 1/353* (2013.01); *G02F 1/3551* (2013.01); *H01S 3/0057* (2013.01); *H01S 3/0092* (2013.01); *G02F 2001/3505* (2013.01)

(58) Field of Classification Search
CPC ...... G02F 1/3501; G02F 1/353; G02F 1/3551; G02F 2001/3505; G02B 13/0005; G02B 26/105; G02B 6/4296; G02B 6/00; H01S 3/0057; H01S 3/0092
USPC ....................................... 359/212.1
See application file for complete search history.

(56) References Cited

U.S. PATENT DOCUMENTS

| | | | |
|---|---|---|---|
| 5,805,626 | A | 9/1998 | Komatsu et al. |
| 6,904,073 | B2 | 6/2005 | Yager et al. |
| 8,306,379 | B2 | 11/2012 | Benabid et al. |
| 2003/0020904 | A1 | 1/2003 | Uto et al. |

(Continued)

OTHER PUBLICATIONS

Hussain et al., "Nonlinear Optical Properties of Some Newly Developed Crystals for Measurement of Ultrafast Laser Pulses", Brazilian Journal of Physics, vol. 36, No. 4A, Dec. 2006, pp. 1281-1284.

(Continued)

*Primary Examiner* — Euncha P Cherry
(74) *Attorney, Agent, or Firm* — Morrison & Foerster LLP

(57) ABSTRACT

Apparatus for generating ultraviolet (UV) pulsed laser-radiation for material-processing includes a laser-source providing infrared (IR) pulsed laser-radiation and a frequency-conversion module. A lithium tetraborate ($Li_2B_4O_7$) crystal located within the frequency-conversion module converts the IR pulsed laser-radiation to UV pulsed laser-radiation by non-linear harmonic generation. The frequency-conversion module is an airtight enclosure that may be evacuated or contain a dry gas. A flexible optical fiber-assembly transports the IR pulsed laser-radiation from the laser-source to the frequency-conversion module.

16 Claims, 2 Drawing Sheets

(56) References Cited

U.S. PATENT DOCUMENTS

| | | | |
|---|---|---|---|
| 2007/0211773 A1 | 9/2007 | Gerstenberger et al. | |
| 2008/0056642 A1* | 3/2008 | Byer | G02B 6/4296 385/27 |
| 2010/0241107 A1* | 9/2010 | Vogler | A61F 9/008 606/5 |
| 2011/0103413 A1 | 5/2011 | Kafka et al. | |
| 2011/0310922 A1 | 12/2011 | Ko et al. | |
| 2013/0043376 A1* | 2/2013 | Widzgowski | H01J 40/02 250/238 |

OTHER PUBLICATIONS

Komatsu et al., "Growth and Ultraviolet Application of $Li_2B_4O_7$ Crystals: Generation of the Fourth and Fifth Harmonics of $Nd:Y_3Al_5O_{12}$ Lasers", Applied Physics Letters, vol. 70, No. 26, Jun. 30, 1997, pp. 3492-3494.

Komatsu et al., "Lithium Tetraborate ($Li_2B_4O_7$) Crystals for the High-Energy Fifth-Harmonic Generation of Nd:YAG Lasers", 1996, 2 pages.

Petrov et al., "Vacuum Ultraviolet Application of $Li_2B_4O_7$ Crystals: Generation of 100 fs Pulses Down to 170 nm", Journal of Applied Physics, vol. 84, No. 11, Dec. 1, 1998, pp. 5887-5892.

Suzuki et al., "0.43-J, 10-Hz Fourth Harmonic Generation of Nd:YAG Laser using Large $Li_2B_4O_7$ Crystals", Optical Society of America, Trends in Optics and Photonics Series, Advanced Solid-State Lasers, vol. 68, 2002, pp. 472-474.

International Search Report and Written Opinion Received for PCT Patent Application No. PCT/EP2017/069855, dated Oct. 12, 2017, 14 pages.

Fattahi et al., "Third-Generation Femtosecond Technology", Optica, vol. 1, No. 1, 2014, pp. 45-63.

Gvozdas, Eduardas, "Instructions on Handling LBO Crystal (Rev1)", Aitechna, UAB, 2016, 1 page.

Hussain et al., "Ultrafast, High Repetition Rate, Ultraviolet, Fiber-Laser-Based Source: Application Towards Yb+ Fast Quantum-Logic", Optics Express, vol. 24, No. 15, 2016, pp. 16638-16648.

Peng et al., "High Average Power, High Energy 1.55 µm Ultra-Short Pulse Laser Beam Delivery Using Large Mode Area Hollow Core Photonic Band-Gap Fiber", Optics Express, vol. 19, No. 2, 2011, pp. 923-932.

Vozzi et al., "Optimal Spectral Broadening in Hollow-Fiber Compressor Systems", Applied Physics B, Lasers and Optics, vol. 80, No. 3, Mar. 2005, pp. 285-289.

* cited by examiner

MODULAR ULTRAVIOLET PULSED LASER-SOURCE

PRIORITY

This application claims priority to U.S. Provisional Application Ser. No. 62/379,639, filed Aug. 25, 2016, the disclosure of which is incorporated herein in its entirety.

TECHNICAL FIELD OF THE INVENTION

The present invention relates in general to generating a beam of ultraviolet (UV) laser-radiation. The invention relates in particular to generating a beam of UV pulsed laser-radiation, for example, having a wavelength shorter than about 380 nanometers and a pulse-duration of less than about 20 picoseconds.

DISCUSSION OF BACKGROUND ART

Laser material processing is increasingly used for cutting, drilling, marking, and scribing a wide range of materials. Traditional mechanical processing produces rough surfaces and unwanted defects, such as micro cracks, which degrade and weaken the processed material. Laser material processing using a focused beam of pulsed laser-radiation produces more precise cuts and holes, having higher quality edges and walls, while minimizing the formation of unwanted defects. Progress in scientific research and manufacturing is leading to laser material processing of an increasing range of materials, while demanding higher processing speed and improved precision.

High-power laser-sources using solid-state gain-media produce fundamental laser-radiation having an infrared (IR) wavelength, typically a wavelength longer than about 750 nanometers (nm). IR laser-radiation is converted into visible and ultraviolet (UV) laser-radiation by harmonic generation in non-linear optical crystals. Short wavelength laser-radiation is capable of drilling smaller holes, making finer marks, and scribing finer features than longer wavelength radiation. UV laser-radiation is therefore preferred for processing many types of material. However, UV laser-radiation degrades optics, particularly optics that are also exposed to ambient oxygen and moisture. Harmonic generation crystals and any beam-shaping or beam-delivery optics are vulnerable to such damage.

Certain laser-sources produce beams of pulsed laser-radiation comprising pulses having femtosecond or picosecond pulse-duration, for example, pulses having a pulse-duration greater than about 100 femtoseconds (fs) and less than about 20 picoseconds (ps). Focused pulsed laser-radiation above a threshold intensity removes material from a workpiece by ablation, minimizing unwanted collateral damage caused by excess heating of surrounding material. Most materials have lower ablation thresholds at UV wavelengths than at IR fundamental wavelengths. Therefore, higher quality processing at higher speeds is possible using UV pulsed laser-radiation.

Many contemporary optoelectronic devices have composite structures. Light emitting diodes, photovoltaic cells, and touchscreens comprise a substrate overlaid with layers of different materials. The overlaying layers may include doped semiconductor layers, thin metal films, thin polymer films, and thin conductive-oxide films. Thin film layers are often deposited on the structure and then patterned by removing material. A focused beam of UV pulsed laser-radiation can selectively remove a thin-film without damaging underlying material, using the spatial selectivity provided by the short-wavelength laser-radiation combined with differences between the ablation thresholds of the layer materials.

Features are made in a material or patterned into a thin-film layer by moving the focused beam of laser-radiation in three dimensions through the material. Linear-translation stages support a workpiece and translate the workpiece in three dimensions through the focused beam up to a maximum controlled scan speed. Higher lateral scan speeds are accessible using state-of-the-art galvanometer-actuated motors to deflect the unfocused beam, translating the focused beam laterally through the workpiece.

There is need for a laser material-processing apparatus capable of generating a focused beam of UV pulses and precisely delivering the focused beam to a workpiece. The laser material-processing apparatus should be resistant to optical damage by the UV laser-radiation. Preferably, the pulses have sufficient energy to ablate a broad range of materials and the pulse-energy is controllable to selectively ablate thin films in composite structures.

SUMMARY OF THE INVENTION

In one aspect, a UV pulsed laser-radiation generating apparatus in accordance with the present invention comprises a laser-source generating a beam of pulsed laser-radiation. The pulsed laser-radiation has a pulse-duration between about 100 femtoseconds and about 200 picoseconds. A frequency-conversion module is provided. The frequency-conversion module has an enclosed interior volume that is sealed airtight. An optical fiber is provided and arranged to transport the beam of pulsed laser-radiation from the laser-source to the frequency-conversion module. A lithium tetraborate crystal is located within the enclosed interior volume of the frequency-conversion module. The lithium tetraborate crystal is arranged to intercept the beam of pulsed laser-radiation and generate therefrom a beam of UV pulsed laser-radiation.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
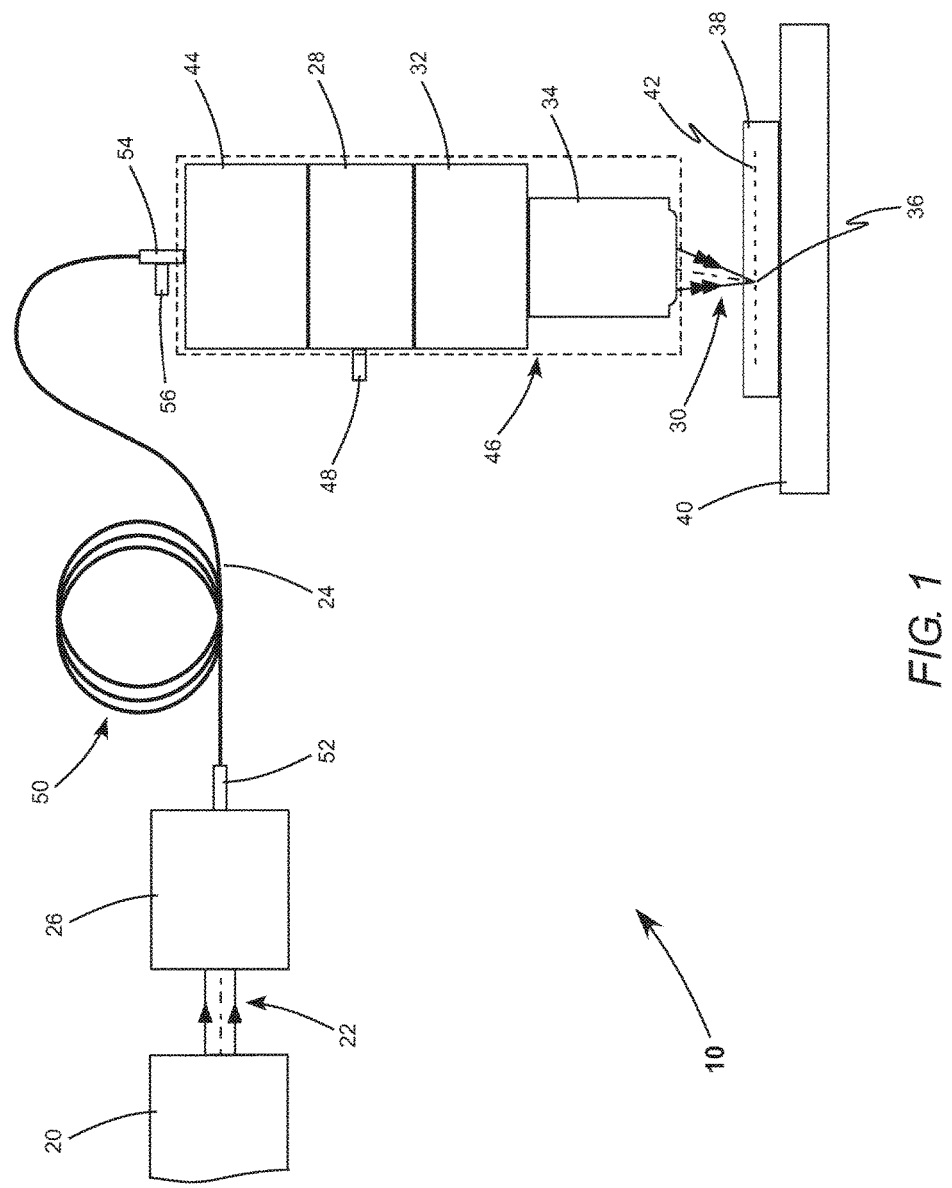
FIG. 1 is an external view schematically illustrating one preferred embodiment of UV pulsed laser-radiation generating apparatus in accordance with the present invention, including a laser source, a fiber-coupling module, an optical fiber, a frequency-conversion module, a beam-scanning module, a focusing lens, and a workpiece.

Turning now to the drawings, wherein like features are designated by like reference numerals, FIG. 1 schematically illustrates one preferred embodiment 10 of ultraviolet (UV) pulsed laser-radiation generating apparatus in accordance with the present invention. Apparatus 10 comprises a laser-source 20 generating a beam of pulsed laser-radiation 22 having a pulse duration between about 100 femtoseconds (fs) and 200 picoseconds (ps). Beam of pulsed laser-radiation 22 has an infrared (IR) wavelength, which is a fundamental wavelength of laser-source 20. By way of example, ytterbium ($Yb^{3+}$) doped gain-fibers produce laser-radiation at about 976 nanometers (nm) or about 1030 nm. Neodymium ($Nd^{3+}$) doped gain-crystals produce laser-radiation at about 1064 nm. Beam of pulsed laser-radiation 22 is coupled into an optical fiber 24 by a fiber-coupling module 26, which may be a discrete module as shown or integrated into laser-source 20.

Optical fiber 24 transports beam of pulsed laser-radiation 22 to a frequency-conversion module 28, which converts beam of pulsed laser-radiation 22 to a beam of UV pulsed laser-radiation 30 by non-linear harmonic generation. Beam of UV pulsed laser-radiation 30 has a UV wavelength that is a quarter or a fifth of the fundamental wavelength. For exemplary fundamental wavelength 976 nm, the fourth harmonic wavelength is 244 nm and the fifth harmonic wavelength is 195 nm. For exemplary fundamental wavelength 1064 nm, the fourth harmonic wavelength is 266 nm and the fifth harmonic wavelength is 213 nm.

Frequency-conversion module 28 is attached to a beam-scanning module 32, which deflects beam of UV pulsed laser-radiation 30. Beam-scanning module 32 is attached to focusing lens 34, which focuses beam of UV pulsed laser-radiation 30 to a focus location 36 at a workpiece 38. Workpiece 38 is supported and located by translation stage 40. Focusing lens 34 and translation stage 40 control longitudinal displacement of focus location 36 with respect to workpiece 38. Beam-scanning module 32 and translation stage 40 control lateral displacement of focus location 36.

Focusing lens 34 is preferably an "F-Theta objective lens". An F-Theta objective lens converts an angular displacement of beam of UV pulsed laser-radiation 30 by beam-scanning module 32 into a proportional lateral displacement of focus location 36 in a flat focal plane 42. Flat focal plane 42 is located at a fixed distance from focusing lens 34. F-Theta objective lenses are commercially available, for example from Thorlabs of Newton, N.J.

An optional pulse-compression module 44 is located between the optical fiber 24 and frequency-conversion module 28. Optional pulse-compression module 44 would be included in apparatus 10 if the pulse-duration of beam of laser-radiation 22 emerging from optical fiber 24 is greater than about 20 ps and would preferably be included if the pulse duration is greater than about 1 ps. Optional pulse-compression module 44 temporally compresses beam of pulsed laser-radiation 22 to a pulse-duration less than about 20 ps, preferably less than about 1 ps. The minimum accessible pulse-duration is limited by the spectral bandwidth of beam of pulsed laser-radiation 22 emerging from optical fiber 24. The compressed pulse-duration may be selected to optimize the non-linear harmonic generation or to meet requirements of the laser material-processing application.

Optional pulse-compression module 44, frequency-conversion module 28, beam-scanning module 32, and focusing lens 34 together form an airtight enclosure 46 (indicated by dashed lines in the drawing). At least one purge port 48 provides a means to evacuate airtight enclosure 46 or to purge airtight enclosure 46 with a dry gas. By way of example, airtight enclosure 46 could be purged with dry nitrogen or with clean dry air. A detailed description of means to create a vacuum or to supply a purge gas is not necessary for understanding principles of the present invention and, accordingly, is not presented herein.

Optical fiber 24 is the main element in an optical fiber assembly 50, which further includes an input connector 52, an output connector 54, a gas port 56, and a protective conduit (not shown) that encases optical fiber 24. Optical fiber 24 and the protective conduit are flexible, which enables airtight enclosure 46 to be located and oriented independently of laser-source 20 and fiber-coupling module 26. Optical fiber assembly 50 may be attached or detached from fiber-coupling module 26 using input connector 52. Output connector 54 attaches optical fiber assembly 50 to frequency-conversion module 28 or to optional pulse compression module 44.

Optical fiber 24 has a hollow core through which beam of pulsed laser-radiation 22 propagates and a relatively large mode-field diameter (MFD). Optical fiber 24 is preferably a photonic-crystal fiber (PCF) having a "Kagome" structure. Kagome PCF has a cladding structure and cladding size to phase-mismatch cladding modes and core modes. In particular, the cladding structure has no transverse resonances at the fundamental wavelength. Propagating beam of pulsed laser-radiation 22 is thereby confined within the hollow core. The MFD of optical fiber 24 is preferably greater than about 15 micrometers (µm) and most preferably is about 40 µm. Kagome PCF is commercially available from GLOphotonics SAS of Limoges, France and is further described in U.S. Pat. No. 8,306,379.

The hollow core of optical fiber 24 may be evacuated to minimize transmission losses due to absorption. Alternatively, the hollow core may contain a gas, which causes spectral broadening of beam of pulsed laser-radiation 22 by non-linear self-phase modulation (SPM). Optical fiber assembly 50 is sealed airtight and is evacuated or filled with gas through gas-port 56. Gas-port 56 is depicted in output connector 54, but a gas-port may be located in input connector 52, without departing from the spirit and scope of the present invention. The gas is preferably clean dry air (CDA) and preferably has a pressure less than about 10 Bar. The amount of spectral broadening in a hollow core fiber is controlled primarily by regulating the gas pressure.

By way of example, a 3.5 meter (m) long Kagome PCF having a MFD of 40 µm is selected to spectrally broaden beam of IR pulsed laser-radiation 22. Each IR pulse has about 90 micro Joule (µJ) energy and about 9 ps duration. The Kagome PCF contains CDA at a pressure of about 2.5 Bar. The IR pulses are spectrally broadened from about 0.3 nm entering input connector 52 to about 2.5 nm emerging from output connector 54. Additional spectral bandwidth enables optional pulse-compression module 44 to compress beam of IR pulsed laser-radiation 22 to a shorter minimum pulse duration. The exemplary 2.5 nm IR pulses can be compressed from about 9 ps to about 780 fs. The transmission efficiency through the stretcher is about 95% and the transmission efficiency through the compressor is about 75%.

Figure 2:
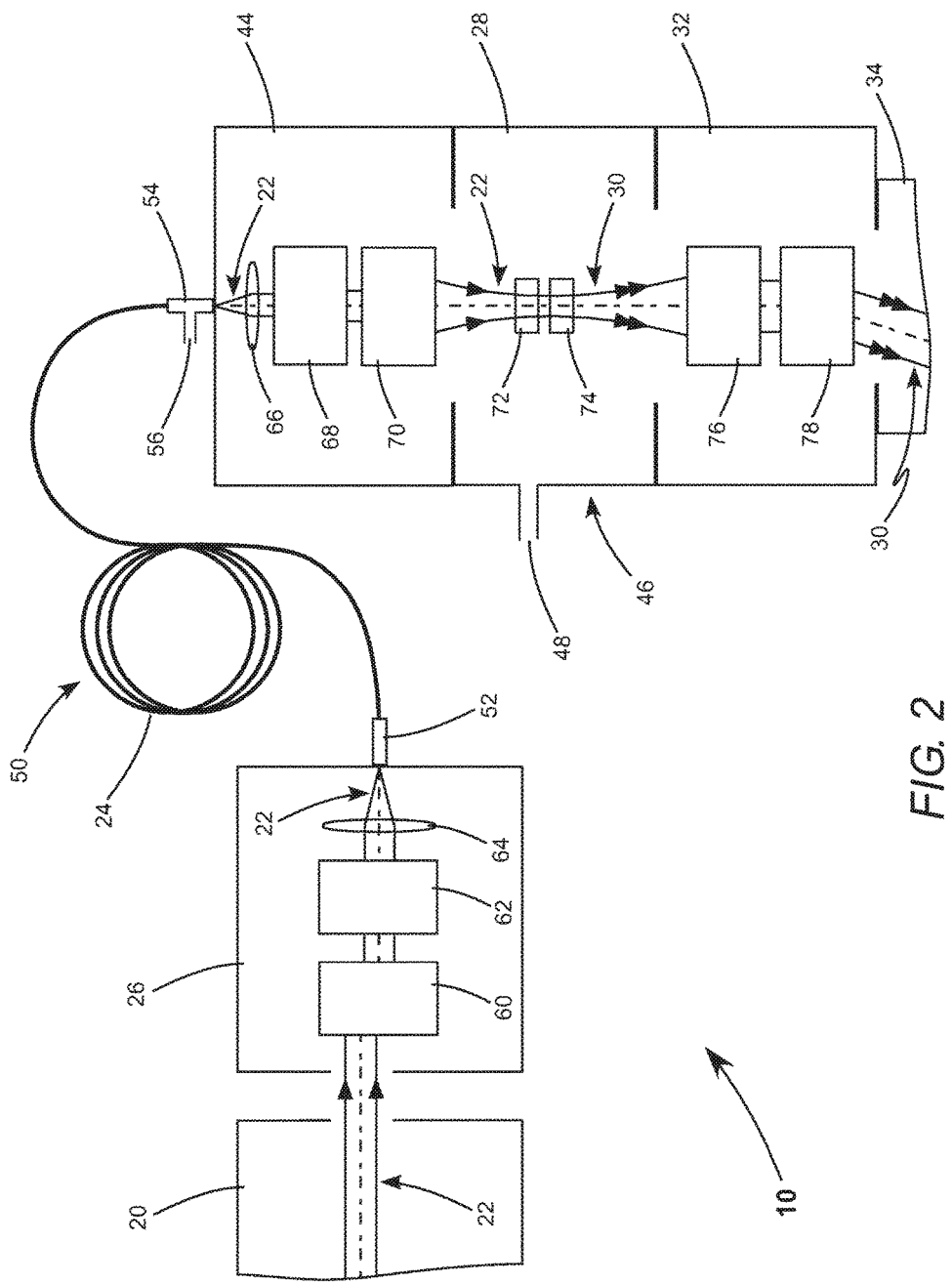
FIG. 2 schematically illustrates, partially in cross-section, additional detail of the UV pulsed laser-radiation generating apparatus of FIG. 1.

FIG. 2 schematically illustrates additional detail of UV pulsed laser-radiation generating apparatus 10 of FIG. 1. Fiber-coupling module 26 includes a beam-pointing tuner 60, a beam-attenuator 62, and a fiber-coupling lens 64. Beam-pointing tuner 60 controls the precise boresight alignment of beam of pulsed laser-radiation 22 incident on fiber-coupling lens 64. Beam-pointing tuner 60 and fiber-coupling lens 64 are located and arranged to couple beam of pulsed laser-radiation 22 into optical fiber 24 with optimum efficiency. Beam-attenuator 62 reduces the pulse energy of beam of pulsed laser-radiation 22, to regulate SPM in optical fiber 24 and thereby further control the spectral bandwidth of beam of pulsed laser-radiation 22 emerging from output connector 54.

Optional pulse-compression module 44 includes a collimating lens 66, a beam-attenuator 68, and pulse compressor 70. Collimating lens 66 is located and arranged to collimate beam of pulsed laser-radiation 22 after it emerges from output connector 54. Beam-attenuator 68 reduces the pulse energy of beam of pulsed laser-radiation 22, to regulate the pulse energy of beam of UV pulsed laser-radiation 30. Pulse compressor 70 temporally compresses beam of pulsed laser-radiation 22, as discussed above. Means to temporally compress a beam of pulsed laser-radiation are well known in the art. For example, a spectrally-broad beam of pulsed laser-radiation is arranged to propagate through dispersive media, such as a pair of prisms or a pair of diffraction gratings. A detailed description of means to attenuate pulse energy and to temporally compress a beam of pulsed laser-radiation is not necessary for understanding principles of the present invention and, accordingly, is not presented herein. In the absence of optional pulse-compression module 44, collimating lens 66 and beam attenuator 68 could be included in frequency-conversion module 28, without departing from the spirit and scope of the present invention.

Frequency-conversion module 28 includes a non-linear crystal 72 and a non-linear crystal 74 to convert beam of pulsed-laser radiation 22 into beam of UV pulsed laser-radiation 30. Non-linear harmonic generation of the fourth or fifth harmonic wavelength typically requires two or three crystals. A plurality of potential conversion combinations are available. By way of example, in one combination, non-linear crystal 72 converts the fundamental wavelength to the second harmonic wavelength and non-linear crystal 74 converts the second harmonic wavelength to the fourth harmonic wavelength. In another combination, non-linear crystal 72 converts the fundamental wavelength to the third harmonic wavelength and non-linear crystal 74 converts the fundamental wavelength and the third harmonic wavelength to the fourth harmonic wavelength.

Suitable materials for non-linear crystal 72 include lithium triborate ($LiB_3O_5$) or beta barium borate ($\beta$-$BaB_2O_4$). Non-linear crystal 74 is preferably made of lithium tetraborate ($Li_2B_4O_7$). Each non-linear crystal is preferably located in a waist of beam of pulsed laser-radiation 22. The efficiency of non-linear harmonic generation is improved by focusing beam of pulsed laser-radiation 22 to a smaller waist diameter, thereby increasing the intensity of beam of pulsed laser-radiation 22 within the non-linear crystal.

For the exemplary conversion combination and the exemplary pulse durations above, laser-source 20 preferably generates at least 50 W of fundamental wavelength power, non-linear crystal 72 preferably generates at least 30 W of second harmonic wavelength power, and non-linear crystal 74 preferably generates at least 5 W of fourth harmonic wavelength power. Laser-source 20 most preferably generates at least 80 W of fundamental wavelength power, non-linear crystal 72 most preferably generates at least 50 W of second harmonic wavelength power, and non-linear crystal 74 most preferably generates at least 10 W of fourth harmonic wavelength power.

Bean-scanning module 32 includes a beam-expander 76 and a beam-scanner 78. Beam-expander 76 controls the diameter of beam of UV pulsed laser-radiation 30 incident on beam-scanner 78 and focusing lens 34. The diameter of beam of UV pulsed laser-radiation 30 is generally selected according to the focusing requirements of the laser material-processing application. Beam-scanner 78 preferably uses galvanometer-actuated mirrors to deflect beam of UV pulses laser-radiation 30. Galvanometer scanners are commercially available, for example from Scanlab AG of Puchheim Germany.

Airtight enclosure 46 is depicted in FIGS. 1 and 2 having one common purge port 48 that is located in frequency-conversion module 28 and having all the modules fluidly connected. Purge ports may be located in any modules of airtight enclosure 46. Alternatively, any one of the modules comprising airtight enclosure 46 may be individually enclosed and have a dedicated purge port, without departing from the spirit and scope of the present invention. To enclose a module, entry and exit windows would be included to transmit the beams of laser-radiation into and out of the module. An apparatus having individually enclosed modules is preferable for minimizing contamination during servicing, if individual modules are substituted or replaced.

The present invention is described above in terms of a preferred embodiment and other embodiments. The invention is not limited, however, to the embodiments described and depicted herein. Rather, the invention is limited only by the claims appended hereto.

What is claimed is:

1. Apparatus for generating ultraviolet pulsed laser-radiation, comprising:
   a laser-source generating a beam of pulsed laser-radiation, the pulsed laser- radiation having a pulse-duration between about 100 femtoseconds and about 200 picoseconds;
   a frequency-conversion module, the frequency-conversion module having an enclosed interior volume that is sealed airtight;
   a hollow-core optical fiber arranged to transport the beam of pulsed laser-radiation from the laser-source to the frequency-conversion module, with the hollow core of the hollow-core optical fiber containing a gas and configured to spectrally broaden the laser-radiation passing through the fiber;
   a free space compressor for receiving the spectrally broadened laser-radiation and temporally compressing the pulses passing therethrough;
   a first non-linear crystal and a second non-linear crystal located within the enclosed interior volume of the frequency-conversion module;
   wherein the beam of pulsed laser-radiation propagates in recited order through the hollow-core optical fiber, the compressor, the first non-linear crystal, and the second non- linear crystal; and
   wherein the first non-linear crystal and the second non-linear crystal are arranged to generate a beam of ultraviolet pulsed laser-radiation.

2. The apparatus of claim 1, wherein the second non-linear crystal is made of lithium tetraborate.

3. The apparatus of claim 1, wherein the pressure of the gas in the hollow core of the hollow-core optical fiber is regulated.

4. The apparatus of claim 1, further comprising a beam-scanner and a focusing lens, the beam-scanner arranged to intercept and deflect the beam of ultraviolet pulsed laser-radiation, the focusing lens arranged to intercept the deflected beam of ultraviolet pulsed laser-radiation and bring the beam of ultraviolet pulsed laser-radiation to a focus at a workpiece.

5. The apparatus of claim 4, wherein the beam of ultraviolet pulsed laser-radiation propagates between the frequency-conversion module and the focusing lens in an airtight enclosure.

6. The apparatus of claim 5, wherein the airtight enclosure is evacuated.

7. The apparatus of claim 5, wherein the airtight enclosure is purged with a dry gas.

8. The apparatus of claim 7, wherein the dry gas is clean dry air.

9. The apparatus of claim 1, wherein the beam of ultraviolet pulsed laser-radiation has a wavelength of about 266 nanometers.

10. The apparatus of claim 1, wherein the beam of ultraviolet pulsed laser-radiation has a wavelength of about 244 nanometers.

11. The apparatus of claim 1, wherein the enclosed interior volume of the frequency- conversion module is evacuated.

12. The apparatus of claim 1, wherein the enclosed interior volume of the frequency- conversion module is purged with a dry gas.

13. The apparatus of claim 12, wherein the dry gas is clean dry air.

14. The apparatus of claim 1, wherein the hollow-core optical fiber has a mode-field diameter greater than about 15 micrometers.

15. The apparatus of claim 1, wherein the pulsed laser-radiation exiting the optical fiber has a pulse-duration greater than 20 picosecond, and wherein the pulse-compressor is arranged to reduce the pulse-duration of the pulsed laser-radiation to less than about 20 picoseconds.

16. The apparatus of claim 1, wherein the pulsed laser-radiation exiting the optical fiber has a pulse-duration greater than 1 picosecond, and wherein the pulse-compressor is arranged to reduce the pulse-duration of the pulsed laser-radiation to less than about 1 picoseconds.

* * * * *